May 30, 1933.  W. F. NEWHOUSE  1,911,710
BUSHEL BASKET MACHINE
Filed Jan. 19, 1931  10 Sheets-Sheet 2
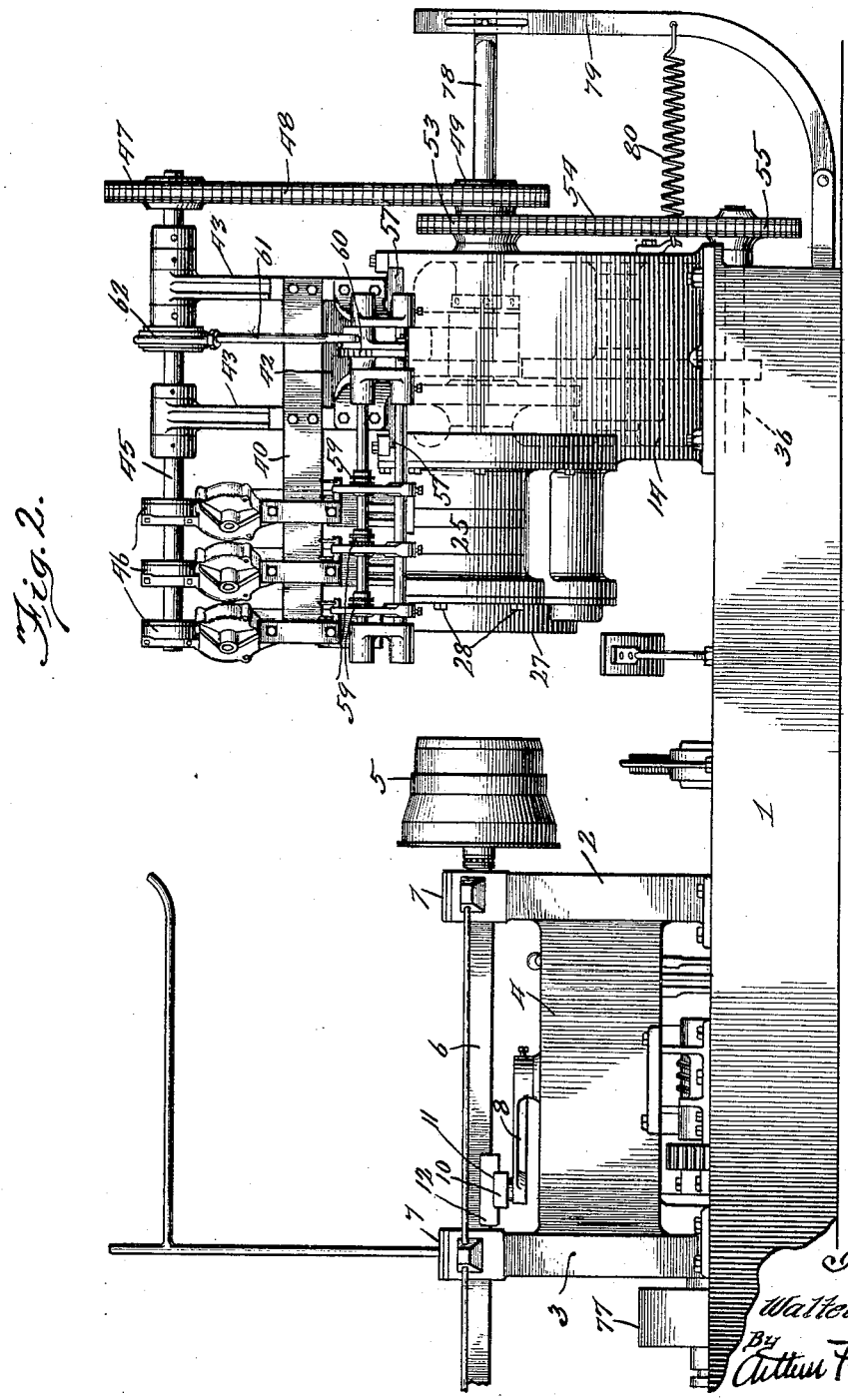

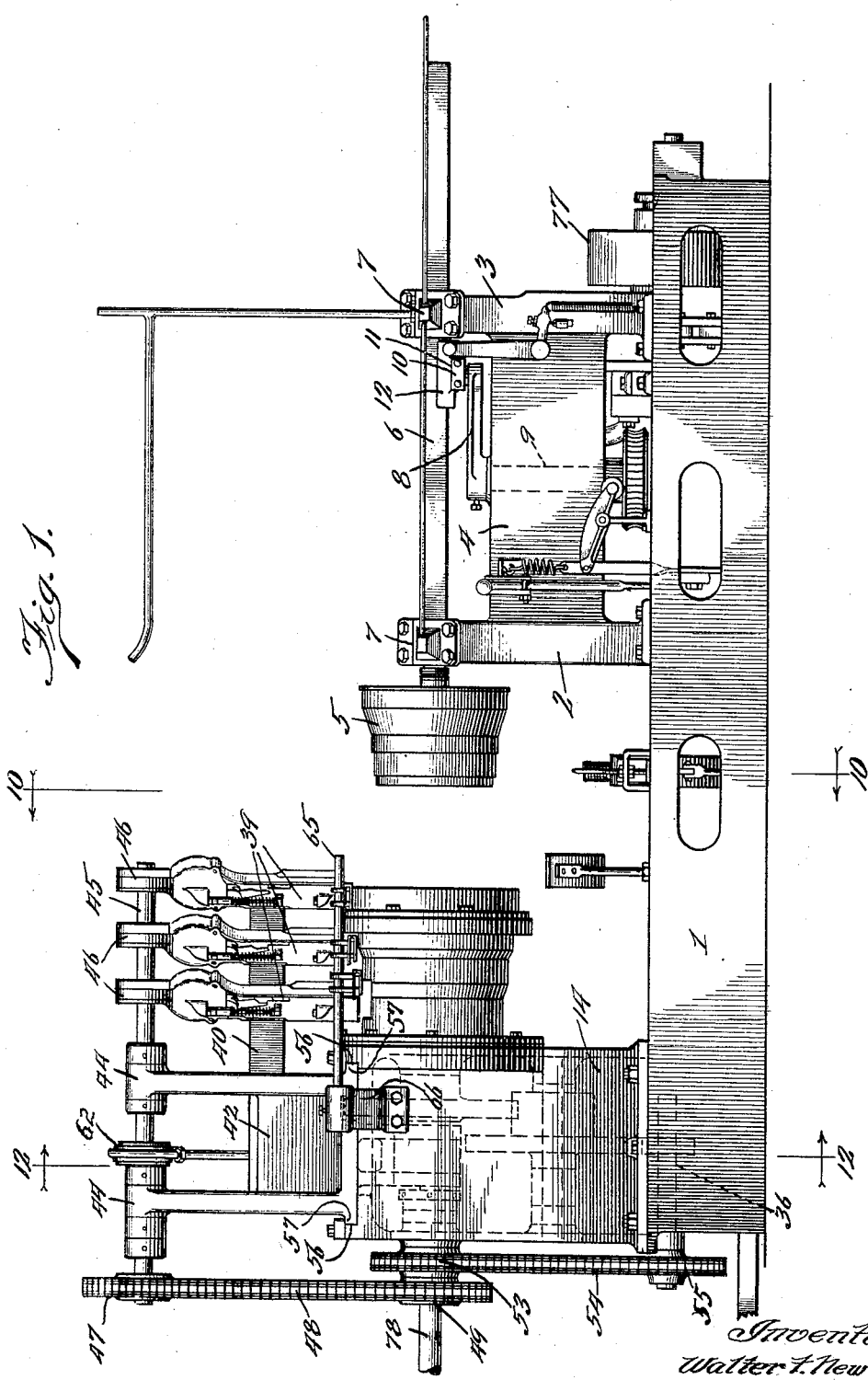

May 30, 1933.  W. F. NEWHOUSE  1,911,710
BUSHEL BASKET MACHINE
Filed Jan. 19, 1931   10 Sheets-Sheet 3
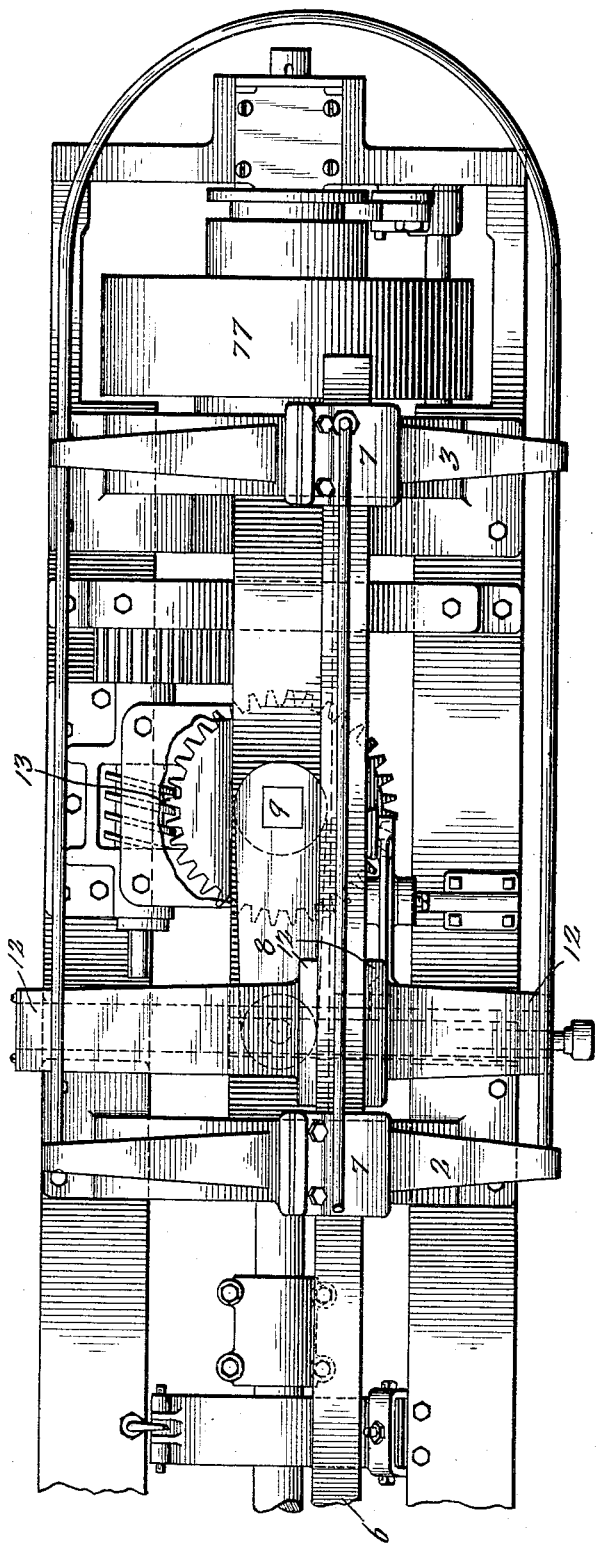
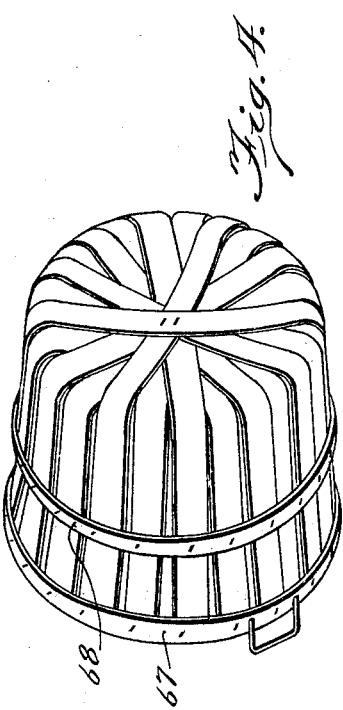
Inventor:
Walter F. Newhouse
By Arthur F. Durand
Atty.

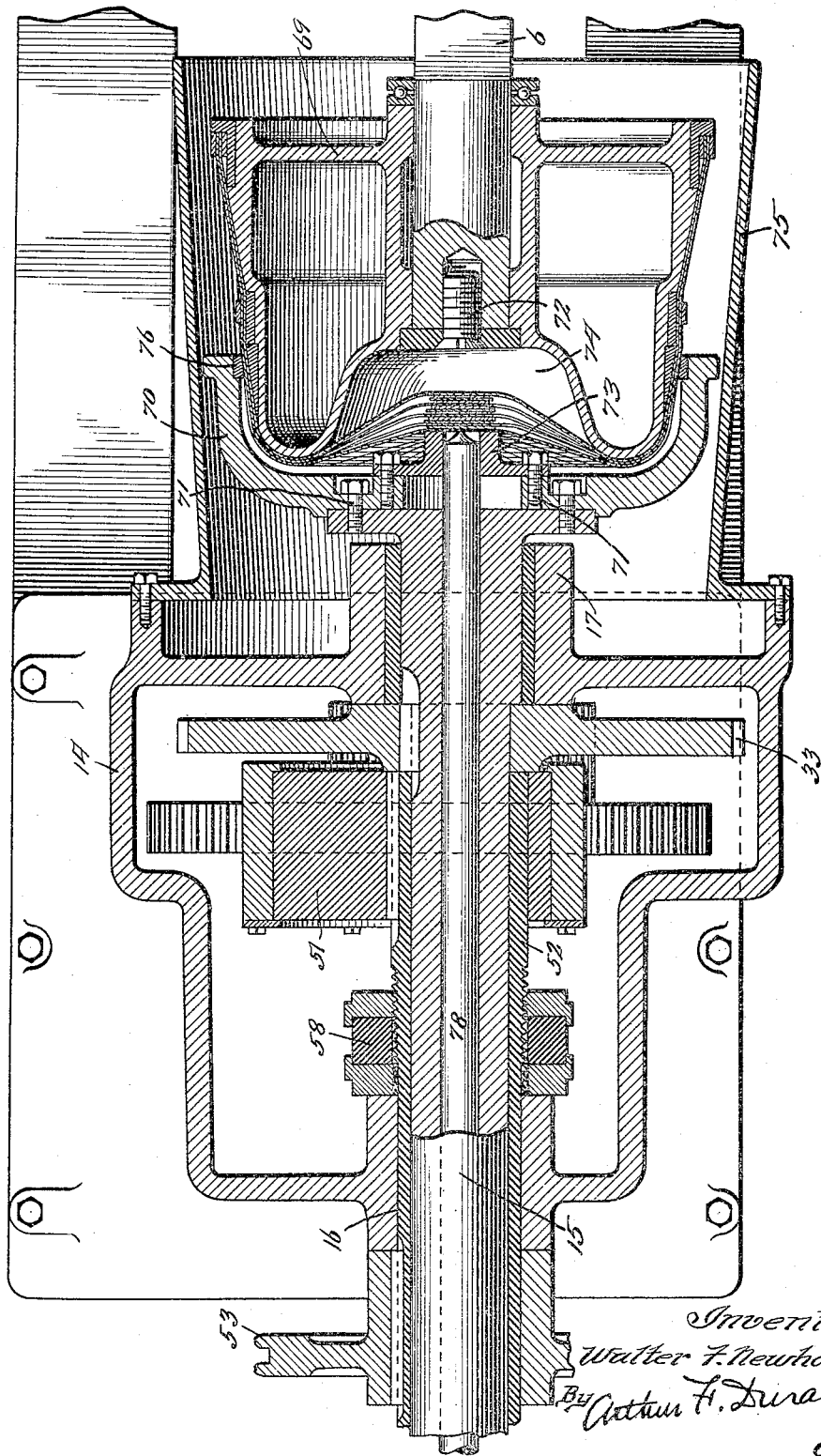

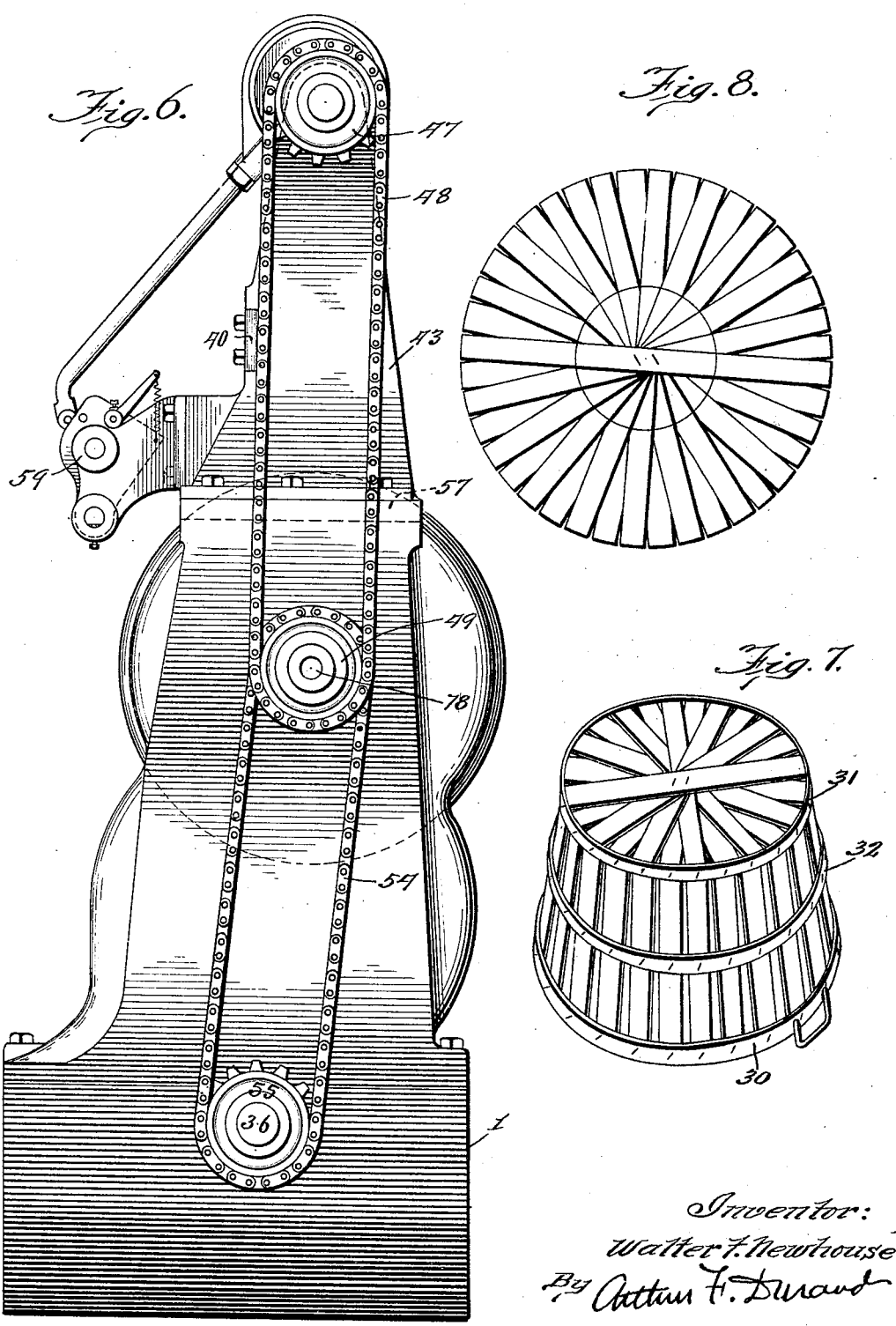

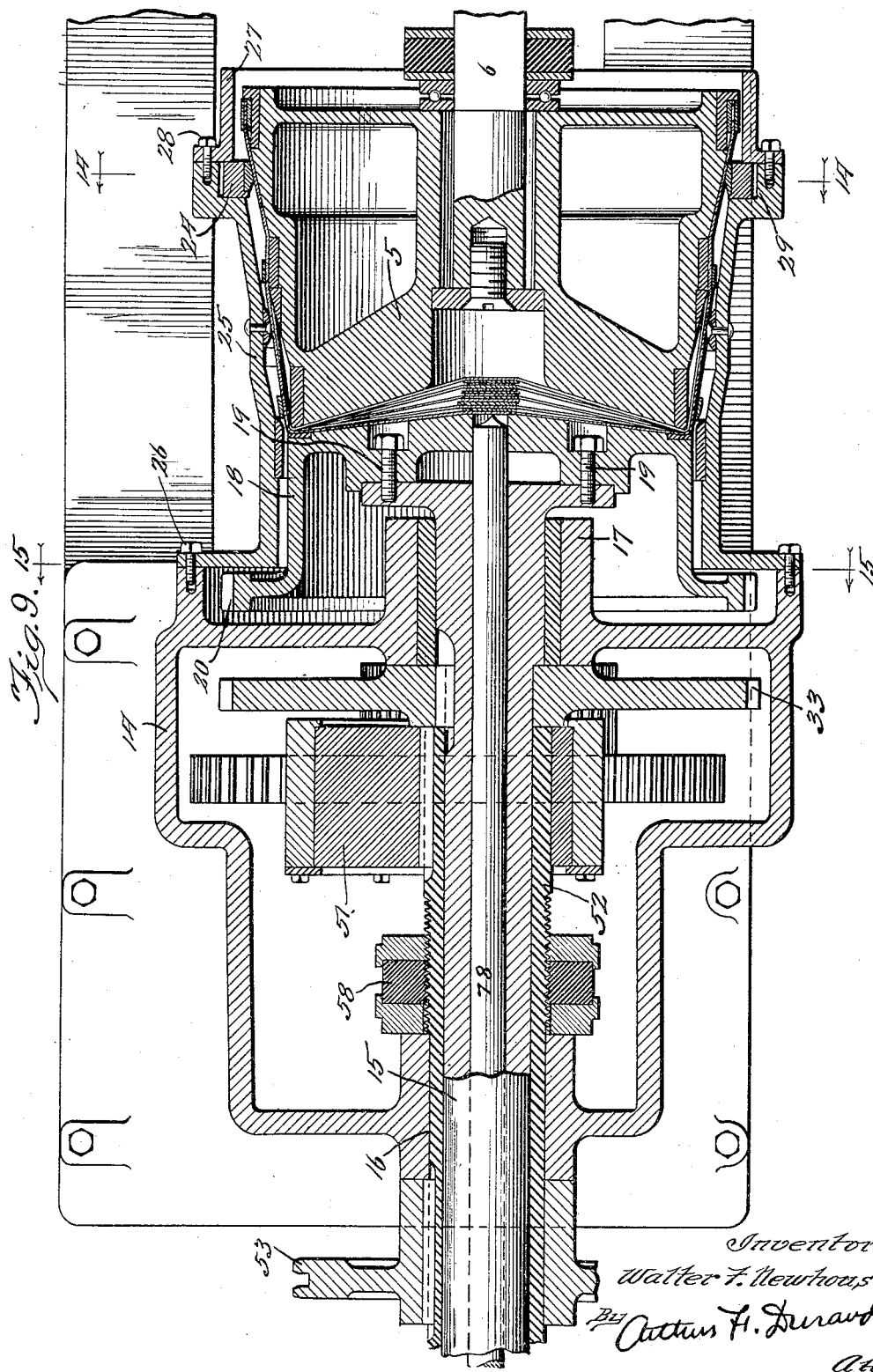

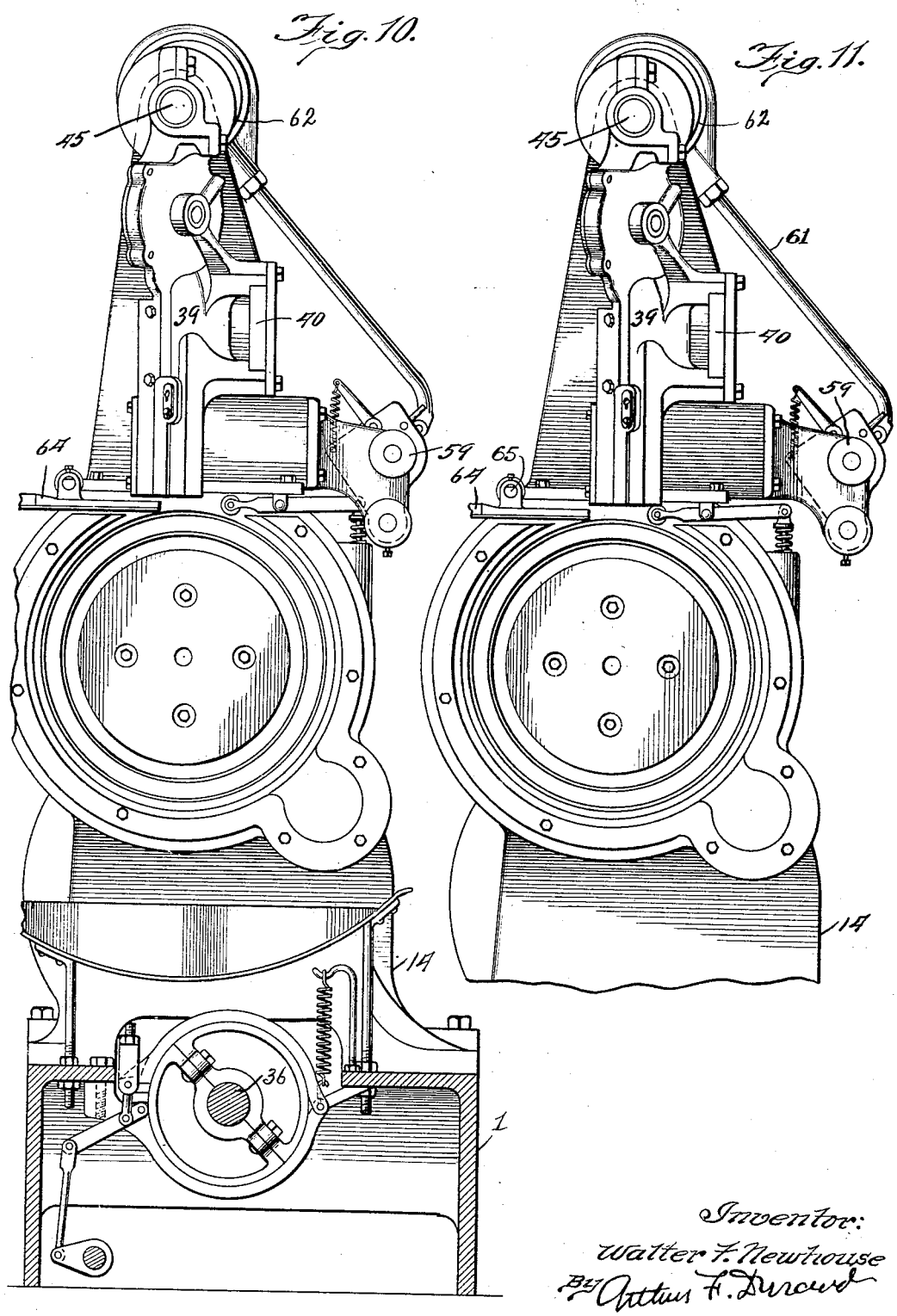

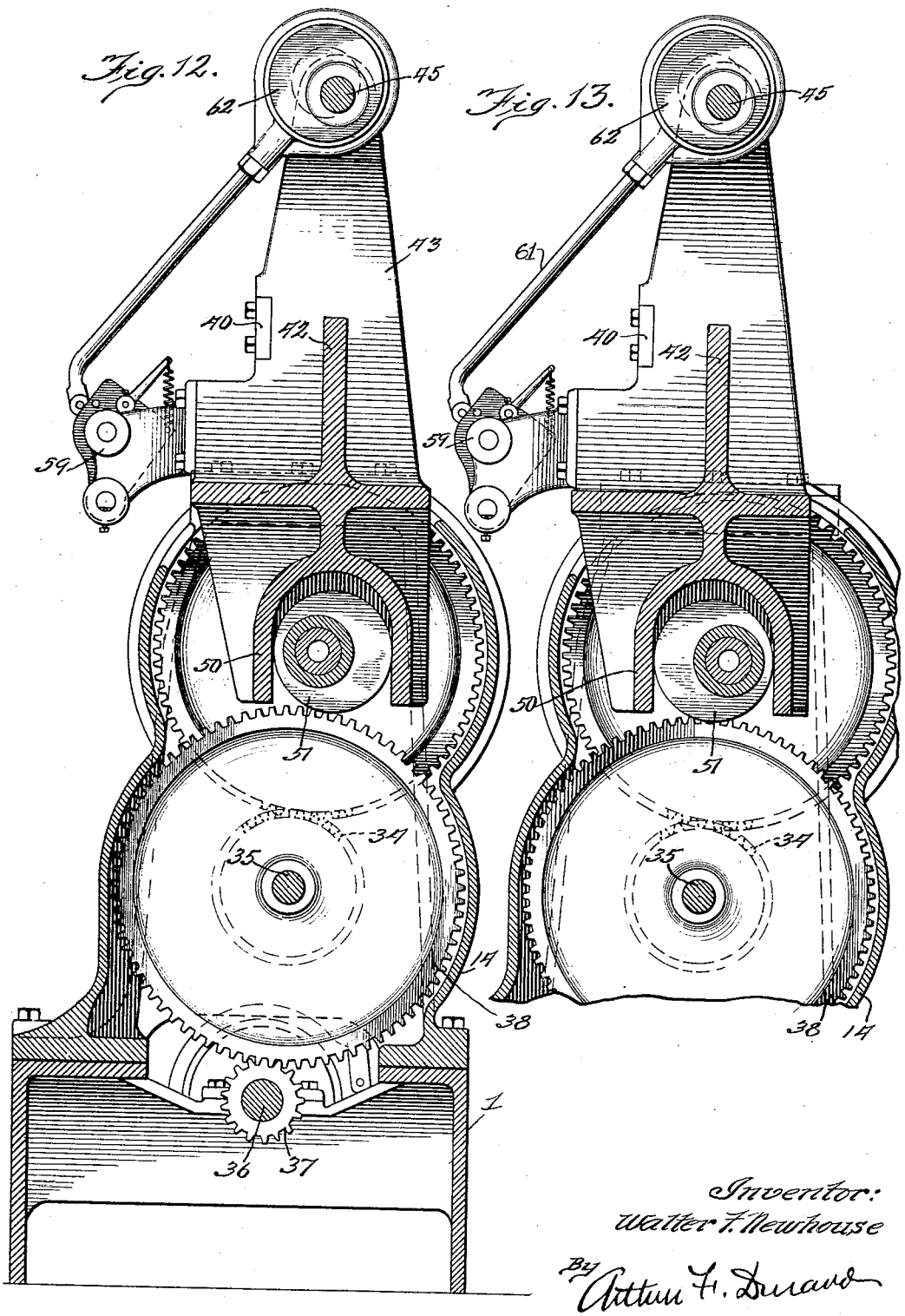

May 30, 1933. W. F. NEWHOUSE 1,911,710
BUSHEL BASKET MACHINE
Filed Jan. 19, 1931 10 Sheets-Sheet 9

Inventor:
Walter F. Newhouse
By Arthur F. Durand
Atty.

May 30, 1933. W. F. NEWHOUSE 1,911,710
BUSHEL BASKET MACHINE
Filed Jan. 19, 1931 10 Sheets-Sheet 10

Inventor:
Walter F. Newhouse
By Arthur F. Durand
Atty.

Patented May 30, 1933

1,911,710

UNITED STATES PATENT OFFICE

WALTER F. NEWHOUSE, OF BENTON HARBOR, MICHIGAN

BUSHEL BASKET MACHINE

Application filed January 19, 1931. Serial No. 509,652.

This invention relates to machines for making baskets or receptacles, and more particularly to machines of this kind in which there is relative rotary motion between the basket or receptacle forming means, by which the materials are held in position to be stapled together, and the stapling mechanism by which the staples are driven in the materials.

Generally stated, the object of the invention is to provide a novel and improved construction and arrangement whereby the stapling mechanism is reciprocated or moved back and forth, bodily, in a horizontal plane, or on a straight line, and whereby the basket or receptacle forming means have a continuous rotary feed, the said mechanism moving a distance with the materials each time a staple is driven, or each time a group of staples is driven, and the said mechanism moving backward a distance while the uninterrupted rotation of the basket materials continues, thereby to increase the speed of production and obtain other advantages, as will hereinafter more fully appear.

Another object is to provide a novel and improved construction whereby the said reciprocation horizontally, of the stapling mechanism, so that it may move in unison with the materials during the actual insertion of a staple or staples, is obtained by actuating means located on the axis of the rotary basket or receptacle forming means, whereby power communicated to the axis of said basket forming means serves also to reciprocate the stapling mechanism laterally and horizontally on a straight line, in the desired manner.

It is also an object to provide certain details and features of construction and combinations tending to increase the general efficiency and the desirability of a basket or receptacle stapling machine of this particular character.

To the foregoing and other useful ends, the invention consists in the matters hereinafter set forth and claimed, and shown in the accompanying drawings, in which,—

Fig. 1 is a side elevation of a basket making machine embodying the principles of the invention.

Fig. 2 is a similar view of the other side of said machine.

Fig. 3 is an enlarged plan view of a portion of said machine.

Fig. 4 is a perspective of a basket that may be made on said machine.

Fig. 5 is a horizontal section, on a larger scale, of a portion of said machine, showing basket forming means for making the basket shown in Fig. 4 of the drawings.

Fig. 6 is an end elevation, on a larger scale, of said machine.

Fig. 7 is a perspective of another form of basket that may be made on said machine.

Fig. 8 is a plan view of the web from which the basket shown in Fig. 7 is made.

Fig. 9 is a view similar to Fig. 5, but showing basket forming means for making the basket shown in Fig. 7 of the drawings.

Fig. 10 is a vertical section, on a larger scale, on line 10—10 in Fig. 1 of the drawings, showing the parts in certain positions.

Fig. 11 is a similar view, showing the parts in different positions.

Fig. 12 is a vertical section, on a larger scale, on line 12—12 in Fig. 1 of the drawings, showing the parts in certain positions.

Fig. 13 is a similar view, showing the parts in different positions.

Figure 14:
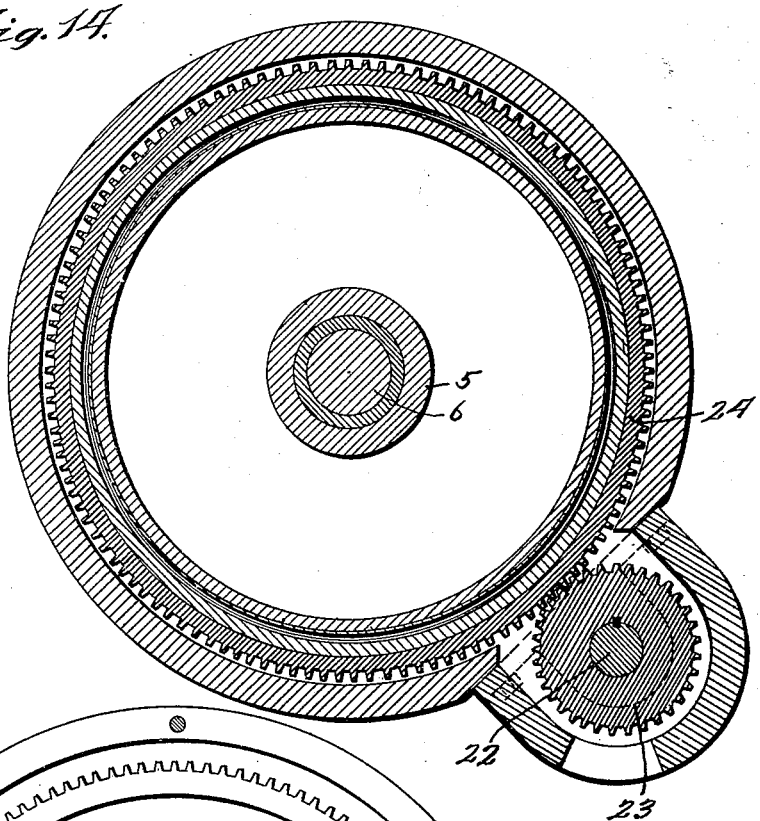
Fig. 14 is a transverse section on line 14—14 in Fig. 9 of the drawings.

As thus illustrated, the invention comprises a bed frame 1 of any suitable or desired character, upon which the various parts of the machine are supported. At one end of the machine, on said bed frame, castings 2 and 3 are supported, and integrally connected together by the web or member 4, as shown. A rotary and reciprocating basket form 5 is mounted on the end of the longitudinally arranged bar 6, which latter is adapted to reciprocate endwise in bearings 7 on the tops of the members 2 and 3, during the production of successive baskets, as will hereinafter more fully appear. For the purpose of reciprocating the basket form 5, a crank arm 8 is provided on the upper end of a vertically disposed shaft 9, said crank arm being provided with a block 10 that slides in a groove 11 of the transversely arranged bar 12, which latter is suitably secured to the bar 6 previously mentioned.

Referring to Fig. 3 of the drawings, it will be seen that the shaft 9 is rotated by worm gearing 13, of any suitable character, whereby the form 5 is reciprocated in suitable timed relation to the other operating parts of the machine.

At the other end of the machine, upon the bed frame 1, a casting or body frame member 14 is suitably mounted in position, as shown, and in the upper portion of this casting a hollow shaft 15 is mounted in bearings 16 and 17, as shown. A basket-bottom clamping member 18 is secured by screws 19 to the end of said hollow shaft, this member 18 being adapted to clamp the bottom of the basket against the form 5, as shown in Fig. 9 of the drawings. The member 18 is provided with gear teeth 20 which engage the pinion 21 on the countershaft 22, which latter is provided with another pinion 23 for engaging the gear ring 24, which latter is adapted to clamp the sides of the basket against the sides of the form 5 in the manner shown in the drawings. The basket mold or shroud 25 encloses the basket form and the basket-bottom clamping member 18, and the basket, as shown in Fig. 9, during the operation of stapling the basket materials together. This form or shroud 25 is removably secured by bolts or screws 26 to the casting 14, and an end section 27 is secured to the shroud by bolts or screws 28, thereby forming a recess 29 in which the ring 24 rotates or revolves, when the machine is in operation.

Figure 15:
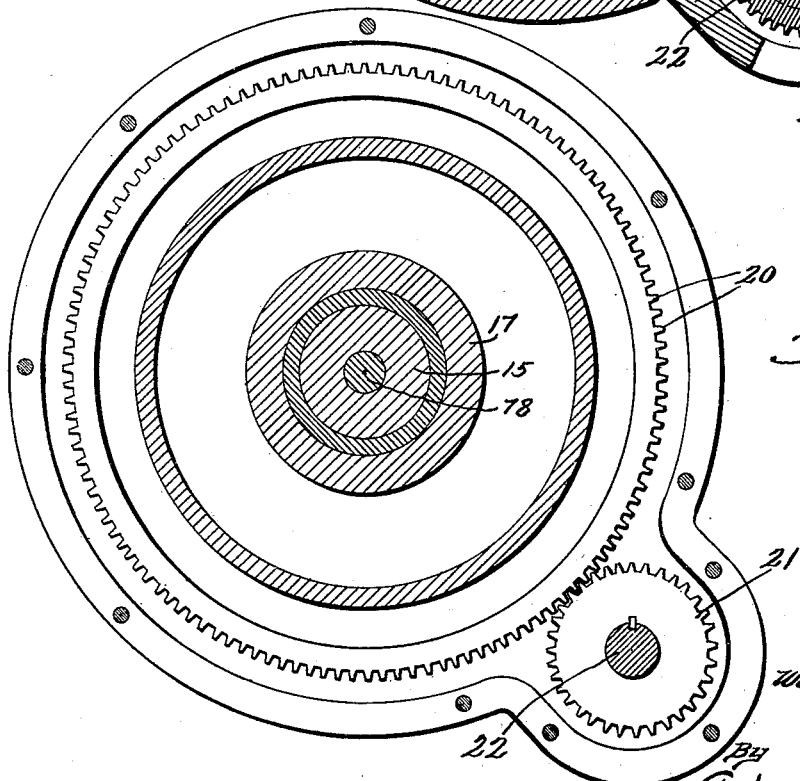
Fig. 15 is a transverse section on line 15—15 in Fig. 9 of the drawings.

As shown in Figs. 9, 14 and 15, the machine is equipped to make the basket shown in Fig. 7 of the drawings, which basket has the top and bottom outer hoops 30, 31, and the middle hoop 32, which hoops are stapled in place by staplers of the stapling mechanism, as will hereinafter more fully appear. Power to rotate the basket forming instrumentalities, while the basket materials are held in place, is communicated to the shaft 15 by the gear 33, which is keyed on the shaft 15, and by the pinion 34 mounted on the countershaft 35, which latter is supported in suitable bearings carried by the casting 14 previously mentioned. Power is communicated from the main longitudinal driving shaft 36 through the pinion 37 and the gear 38 to the shaft 35, whereby the basket forming instrumentalities are given a continuous rotary feed, in the desired manner, during the operation of the machine.

Figure 16:
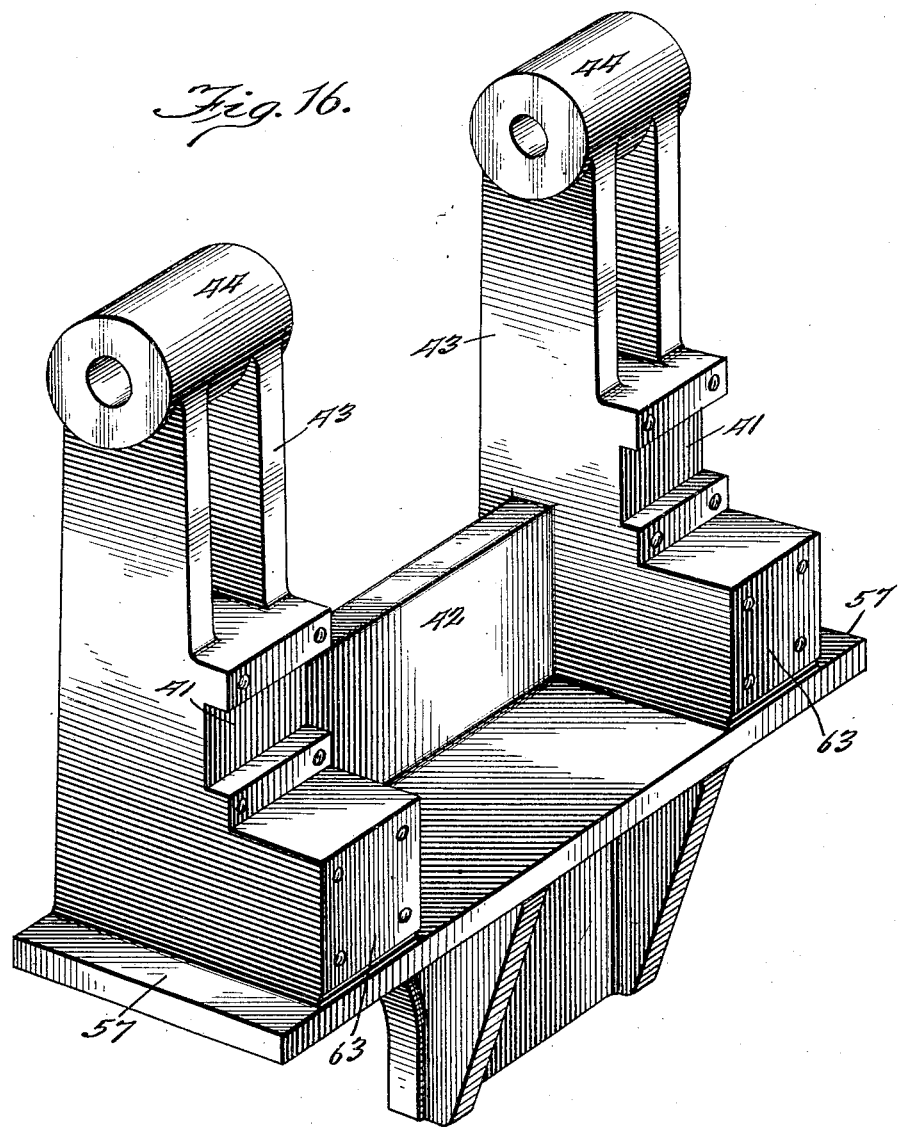
Fig. 16 is a perspective of the reciprocating casting or body frame upon which the elements of the staple forming and driving mechanism are mounted to reciprocate or move back and forth bodily during the operation of actually inserting the staples in the work.

The three staplers 39 are of any suitable character, and are mounted vertically, for adjustment toward and away from each other, on the bar 40, which latter is suitably secured in recesses 41 formed on one side of the reciprocating or sliding casting or stapler support 42, shown in Fig. 16 of the drawings. This member 42 has upstanding end portions 43 provided at their upper ends with bearings 44 for the overhead shaft 45, upon which are mounted the means 46 for actuating the staplers, to form and drive the staples. The shaft 45 has a sprocket wheel 47 that is connected by a sprocket chain 48 with a sprocket wheel 49 on the shaft 15, whereby the rotation of the latter by the aforesaid means will cause rotation of the shaft 45 in the desired manner, in timed relation to the other operating parts. The member 42 is provided at its lower end with a fork or yoke 50 for engagement with the eccentric cam 51 which is keyed on the sleeve 52 on the shaft 15, as shown in Fig. 9 of the drawings. A sprocket wheel 53 is keyed on the outer end of the sleeve 52, and this sprocket wheel is connected by a link belt 54 with a sprocket wheel 55 on the main driving shaft 36 previously mentioned. In this way, rotation of the shaft 15 serves to cause rotation of the eccentric cam 51, and this in turn causes a lateral and horizontal reciprocation of the member 42 in its guides 56 formed on top of the casting or frame member 14 previously mentioned. These guides are engaged by the flanges 57 of the member 42, in a manner that will be readily understood, whereby the entire stapling mechanism moves back and forth laterally, or reciprocates horizontally on a straight line, during the operation of successively inserting the staples into the basket materials.

A suitable cushion device 58, on the sleeve 52, serves to cushion the bump or connection between the form 5 and the member 18, when they come together, thereby to reduce shock or strain and prevent injury to the basket materials, while insuring the desired degree of compression of the basket bottom between the bottom forming members 5 and 18. It will be understood, of course, that in this way the basket is forcibly rotated, and it is the rotation of the basket, by frictional engagement therewith, that rotates the basket bottom about its horizontal and longitudinal axis, by continuous rotary motion, during the operation of driving the staples in the basket materials.

Feed mechanism 59, or feed devices, for feeding the wire from which the staples are made, of any suitable character, is actuated by a ratchet device 60, which in turn is actuated by a rod 61 connected with the eccentric device 62 on the shaft 45 previously mentioned. Said wire feeding mechanism is preferably carried by brackets bolted to the extensions 63 of the member 42, in the manner shown.

Hoop guides 64 are suitably carried on the rod 65, to guide the basket hoop strips into position below the staplers, this rod being carried on a bracket 66 suitably bolted to the casting 14 previously mentioned.

As shown in Figs. 4 and 5, a so-called round-bottom basket may be made, instead of the straight-side basket previously described. As shown in Fig. 4, the basket has the two outer hoops 67 and 68, but no bottom hoop, and hence for this basket only two of the staplers would be employed. For this purpose, the members 5 and 18 can be removed from the machine, and can be replaced by the basket form 69 and the basket-bottom clamping member 70, as shown in Fig. 5 of the drawings. These are detachably held in place, as shown, bolts or screws 71 holding the member 70 in place on the end of the hollow shaft 15, and the screw 72 holding the form 69 in place on the end of the bar 6 previously mentioned. The member 70 has a detachable center portion 73 to engage the middle portion of the bottom of the basket, to push this middle portion into the cavity 74 formed in the end of the form 69, thereby to produce what is ordinarily called a round-bottom bushel basket. In this case, the shroud 75 does not touch the basket, but co-operates with the form 69 in initially bending the basket materials into basket form, before the basket materials engage the member 70 that co-operates with the form 69 to form the bottom of the basket. The member 69 and the basket are rotated entirely by the frictional engagement between the basket and the clamping edge portion 76 of the member 70, when they are brought together in the manner shown in Fig. 5 of the drawings.

It will be understood that the machine may be driven in any suitable or desired manner, as by a pulley 77 on the main driving shaft 36. It will also be understood that the machine will be stopped when the basket is finished, so that the basket may be released, and for this purpose a knock-out rod 78, operated by a lever 79 and a spring 80, may be employed, this rod pushing the basket out of the machine with the basket form, when the latter is retracted.

From the foregoing it will be seen that the entire stapling mechanism is reciprocated bodily, in a horizontal plane, or on a straight line, laterally of said mechanism, while the staple forming and driving elements of said mechanism are being actuated up and down, in the well known manner, to form and drive the staples. Upon the initial insertion of a staple or staples, the stapling mechanism moves forward in unison with the continuous rotary motion of the basket materials, thereby to prevent distortion of the staples or defective work. This horizontal reciprocation of the stapling mechanism is caused by rotary means on the axis of the basket forming means, whereby the communication of power to rotate the basket forming means, serves also to automatically reciprocate the stapling mechanism horizontally, in timed relation to the staple forming and driving operations, which latter occur successively around the circumference of the basket hoops. The staplers are adjustable on the bar 40 toward and away from each other, in accordance with the location of the hoops on the basket, in a manner that will be readily understood. Thus, the continuous rotary-feed and horizontally reciprocating stapling-mechanism machine, shown and described, has elements which are interchangeable to produce baskets of different shapes, in the manner explained.

It will be seen that the casting 42 and the staplers 39 and the shaft 45 and the wire feeding devices 59 and the ratchet device 60 constitute a separate structural unit which can be removed from the machine intact by removing the tops of the guides 56, and by disconnecting the chain or link belt 48, whereby said unit can be lifted off of the machine. The reciprocation of the stapling mechanism laterally, by sliding it bodily back and forth, in a horizontal plane, is on a straight line at right angles to the radius of the receptacle forming means. However, notwithstanding this straight motion of the stapling mechanism, and the circular motion of the basket materials, the co-operating parts are so arranged that the staples are properly inserted, the point of insertion of the staple in the work practically moving for a short distance parallel with the motion of the stapling mechanism, notwithstanding that the feeding motion of the work is on the line of a circle.

From the foregoing, it will be seen that the feeding motion of the work-holding means is continuously rotary for each entire basket, the center shaft or axis of the work-holding means, such as the shaft 15, being given a continuous and complete rotary motion for each basket, whereby the rotary motion of the feeding means and of the work is uninterrupted and is continuous throughout the entire operation of stapling each basket. The only interruption of such continuous rotary feeding motion is between baskets, whereby an attendant or operator may have time in which to take off a finished basket and insert in place thereof the materials for another basket. The stapling mechanism has a power-operated overhead axis of operation, and means are provided on one of said axes, preferably the axis of the work-feeding means, to reciprocate the stapling mechanism laterally in a straight line, whereby the vertical plane of said overhead axis shifts laterally from one side to the other, and back again, of the vertical plane of the axis of said continuously rotary work holding and feeding means.

What I claim as my invention is:

1. In a machine for making baskets or receptacles, the combination of receptacles forming means having continuous rotary feeding motion, about an axis fixed in relation to the receptacle, so that the feed is continuously rotary for each entire receptacle, stapling mechanism operable up and down to drive the staples and movably supported to reciprocate laterally on a straight line, at right angles to the radius of said receptacle forming means, having a horizontally shifting axis of actuation, whereby said mechanism moves a distance with the receptacle materials in the driving of the staples, power operated means on one of said axes for causing said horizontal reciprocation of said mechanism in suitably timed relation, and motion transmitting means leading to said shifting axis to operate said mechanism.

2. A structure as specified in claim 1, having means for mounting said stapling mechanism comprising a body member, and comprising horizontal guides in which said member is slidable back and forth bodily, in a direction at right angles to the axis of said receptacle forming means, when viewed from above.

3. A structure as specified in claim 1, said means for causing reciprocation of said mechanism comprising rotary means on the axis of said receptacle forming means.

4. A structure as specified in claim 1, said receptacle forming means comprising a rotary form for engaging the inner surface of the receptacle, and comprising rotary means for clamping the bottom of the receptacle against said form, said form being rotated by frictional engagement with the receptacle.

5. A structure as specified in claim 1, said means for causing reciprocation of said mechanism comprising a rotary eccentric cam on the axis of said receptacle forming means, and means for engaging said eccentric cam to cause said mechanism to move back and forth bodily in a horizontal plane.

6. A structure as specified in claim 1, said power means comprising a main driving shaft having power connection therefrom to said receptacle forming means, and having a separate power connection to reciprocate the stapling mechanism in a horizontal plane.

7. A structure as specified in claim 1, said power means comprising a main driving shaft having gear connection therefrom to said receptacle forming means, and having a separate connection therefrom to reciprocate the stapling mechanism in a horizontal plane, in combination with an overhead shaft for actuating the stapler mechanism to drive the staples, and a power connection whereby rotation of the receptacle forming means transmits power to said shaft.

8. A structure as specified in claim 1, comprising interchangeable elements whereby receptacles of different shapes may be made on said machine, without disturbing the character of the lateral reciprocating motion of the stapling mechanism.

9. A structure as specified in claim 1, the means for supporting the stapling mechanism to reciprocate laterally as stated, comprising a slidable casting upon which the staple forming and driving elements are mounted, said casting having horizontal guides at its bottom, and said casting having its lower end provided with engaging portions, and a rotary eccentric cam on the axis of the receptacle forming means for engagement with said engaging portions, whereby rotation of the receptacle forming means causes said casting to slide back and forth in a horizontal plane.

10. A structure as specified in claim 1, having means for supporting the stapling mechanism comprising a horizontally slidable casting providing a support for the staple forming and driving elements, having means mounted thereon for actuating said mechanism to form and drive the staples, and having other means mounted thereon to feed the wire to the staplers, whereby said casting and stapling elements and wire feeding elements form a separate structural unit which is removable intact from the machine.

11. In a work feeding and stapling machine, the combination of stapling mechanism mounted to slide bodily back and forth horizontally, feeding means for feeding the work continuously parallel with the direction of reciprocating motion of said mechanism, a rotary shaft to which power is communicated to feed the work, forming an axis of operation for said feeding means, and eccentric cam means on said shaft for causing said reciprocating motion of said mechanism.

12. A structure as specified in claim 11, said eccentric cam being loose on said shaft, and separate means for rotating said eccentric cam.

13. A structure as specified in claim 11, having means comprising a power connection from said shaft to said mechanism for actuating the latter to drive the staples.

14. In receptacle stapling machinery, the combination of rotary work holding and feeding means to support and rotate the receptacle, power-operated means whereby the feeding motion for said work holding and feeding means is continuously rotary for each entire receptacle, and stapling mechanism operative to insert staples in said receptacle during the said continuous rotary motion thereof, together with instrumentalities operated from the axis of said rotary feeding means for causing said mechanism to reciprocate in a straight line substantially parallel with the adjacent moving portion of the receptacle, whereby said mechanism moves a distance with the receptacle materials during the insertion of each and every staple.

15. A structure as specified in claim 14, said mechanism having an overhead longitudinal axis of operation, extending parallel with the axis of said work holding and feeding means, said overhead axis having a vertical plane which is movable from one side to the other of the vertical plane of said lower axis, and back again, for each operation of said mechanism, by the action of said instrumentalities.

16. A structure as specified in claim 14, said instrumentalities comprising cam means on the axis of said rotary feeding means, together with means depending from the bottom of said mechanism to engage said cam means.

17. A structure as specified in claim 14, said instrumentalities comprising cam means on the axis of said rotary feeding means, together with means depending from the bottom of said mechanism to engage said cam means, said mechanism being self-contained and provided with both wire feeding and hoop-strip feeding means, together with flexible means for communicating actuating power to said mechanism while the staples are being driven, and while said mechanism is reciprocating as stated.

18. In receptacle stapling machinery, the combination of rotary work holding and feeding means to support and rotate the receptacle, power-operated means whereby the feeding motion for said work holding and feeding means is continuously rotary for each entire receptacle, and stapling mechanism operative to insert staples in said receptacle during the said continuous rotary motion thereof, together with instrumentalities for causing said mechanism to reciprocate in a straight line substantially parallel with the adjacent moving portion of the receptacle, whereby said mechanism moves a distance with the receptacle materials during the insertion of each and every staple, said mechanism having an overhead longitudinal axis of operation, extending parallel with the axis of said work holding and feeding means, said overhead axis having a vertical plane which is movable from one side to the other of the vertical plane of said lower axis, and back again, for each operation of said mechanism, by the action of said instrumentalities.

19. In a machine for making baskets or receptacles, the combination of receptacle forming means having continuous rotary feeding motion, about an axis fixed in relation to the receptacle, so that the feed is continuously rotary for each entire receptacle, stapling mechanism mounted to reciprocate laterally on a straight line, at right angles to the radius of said receptacle forming means, whereby said mechanism moves a distance with the receptacle materials in the driving of the staples, said mechanism having an overhead axis of operation, and power operated means on one of said axes for causing the said reciprocation of said mechanism in suitably timed relation, said means for causing reciprocation of said mechanism comprising rotary means on the axis of said receptacle forming means.

20. In a machine for making baskets or receptacles, the combination of receptacle forming means having continuous rotary feeding motion, about an axis fixed in relation to the receptacle, so that the feed is continuously rotary for each entire receptacle, stapling mechanism mounted to reciprocate laterally on a straight line, at right angles to the radius of said receptacle forming means, whereby said mechanism moves a distance with the receptacle materials in the driving of the staples, said mechanism having an overhead axis of operation, and power operated means on one of said axes for causing the said reciprocation of said mechanism in suitably timed relation, said means for causing reciprocation of said mechanism comprising a rotary eccentric cam on the axis of said receptacle forming means, and means for engaging said eccentric cam to cause said mechanism to move back and forth bodily in a horizontal plane.

21. In a machine for making baskets or receptacles, the combination of receptacle forming means having continuous rotary feeding motion, about an axis fixed in relation to the receptacle, so that the feed is continuously rotary for each entire receptacle, stapling mechanism mounted to reciprocate laterally on a straight line, at right angles to the radius of said receptacle forming means, whereby said mechanism moves a distance with the receptacle materials in the driving of the staples, said mechanism having an overhead axis of operation, and power operated means on one of said axes for causing the said reciprocation of said mechanism in suitably timed relation, said means for mounting the stapling mechanism to reciprocate laterally as stated, comprising a casting upon which the staple forming and driving elements are mounted, said casting having horizontal guides at its bottom, and said casting having its lower end provided with engaging portions, and a rotary eccentric cam on the axis of the receptacle forming means for engagement with said engaging portions, whereby rotation of the receptacle forming means causes said casting to slide back and forth in a horizontal plane.

22. In a machine for stapling receptacles, power operated means for controlling and feeding the work continuously, a stapler mechanism mounted to operate up and down on the moving work and mounted to shift back and forth over the work, thereby to have a feeding movement a distance with the work during each actual insertion of staples, and a rotary shaft forming part of said power operated means and disposed below the stapling plane and provided with means to cause said back and forth shifting motion of said stapler mechanism, the work having a curved path of travel on the line of a circle struck from the axis of said shaft.

23. A structure as specified in claim 22, said shaft being disposed transversely of the direction of feed movement of the stapler mechanism.

24. A structure as specified in claim 22, said mechanism being adapted to direct a row of staples simultaneously, and said shaft being disposed below and parallel with the plurality of staples driven by each downward actuation of said mechanism.

25. A structure as specified in claim 22, said mechanism having an overhead actuating axis parallel with said shaft.

26. A structure as specified in claim 22, said mechanism having an overhead actuating axis parallel with said shaft, and a sprocket chain drive from said shaft to said axis.

27. In a stapling machine, instrumentalities providing a horizontally disposed axis about which the materials of the work have a circular feeding motion, stapler mechanism operative to insert staples in the work, and devices operated from said axis to control the action of said stapler mechanism.

28. A structure as specified in claim 27, said devices being operative to move said mechanism a distance with the materials, while staples are being inserted therein, whereby said mechanism is operative to drive staples in the moving work.

29. A structure as specified in claim 27, said axis extending longitudinally of the machine, and the materials having a complete circular path of travel around said axis, with continuous and unbroken circular motion and said devices being operative to move said mechanism a distance with the materials while staples are being inserted therein.

30. A structure as specified in claim 27, said instrumentalities being operative to feed the work with a continuous and unbroken circular motion, causing it to describe a complete circle without interruption about said axis.

31. A structure as specified in claim 27, said axis comprising a longitudinal and power operating shaft, and said devices being actuated by rotation of said shaft to cause back and forth motion of said mechanism in a direction alternately with and opposite to the circular feeding motion of the work, whereby staples are inserted in the moving materials.

32. A structure as specified in claim 27, said devices being operative to reciprocate said mechanism sidewise, over the moving materials, whereby said mechanism alternately moves with and opposite to the direction of travel of the work.

Specification signed this thirteenth day of January 1931.

WALTER F. NEWHOUSE.